United States Patent
Elgarat

(10) Patent No.: US 11,418,595 B2
(45) Date of Patent: Aug. 16, 2022

(54) SYSTEM, METHOD, AND COMPUTER PROGRAM FOR INTERNET OF THINGS (IOT) COMMUNITY SERVICES

(71) Applicant: Amdocs Development Limited, Limassol (CY)

(72) Inventor: Sharon Elgarat, Kibbutz Mefalsim (IL)

(73) Assignee: AMDOCS DEVELOPMENT LIMITED, Limassol (CY)

(*) Notice: Subject to any disclaimer, the term of this patent is extended or adjusted under 35 U.S.C. 154(b) by 0 days.

(21) Appl. No.: 16/816,082

(22) Filed: Mar. 11, 2020

(65) Prior Publication Data

US 2021/0289031 A1    Sep. 16, 2021

(51) Int. Cl.
*G06F 15/16* (2006.01)
*H04L 67/12* (2022.01)
*H04L 67/1074* (2022.01)

(52) U.S. Cl.
CPC .......... *H04L 67/12* (2013.01); *H04L 67/1076* (2013.01); *H04L 67/1078* (2013.01)

(58) Field of Classification Search
CPC .. H04L 67/12; H04L 67/1076; H04L 67/1078
USPC ........................................................ 709/201
See application file for complete search history.

(56) References Cited

U.S. PATENT DOCUMENTS

| | | | |
|---|---|---|---|
| 2016/0105305 A1 | 4/2016 | Pignataro et al. | |
| 2018/0152506 A1 | 5/2018 | Simo et al. | |
| 2018/0285766 A1* | 10/2018 | Shen | G06N 5/046 |
| 2019/0042378 A1* | 2/2019 | Wouhaybi | H04L 67/12 |
| 2019/0188797 A1* | 6/2019 | Przechocki | G06N 20/00 |
| 2019/0265971 A1* | 8/2019 | Behzadi | G06F 16/283 |
| 2020/0014765 A1 | 1/2020 | Jablonski | |
| 2020/0050494 A1* | 2/2020 | Bartfai-Walcott | G06F 9/5083 |
| 2020/0227178 A1* | 7/2020 | Lombardi | G06N 20/00 |
| 2021/0157312 A1* | 5/2021 | Cella | G05B 23/0294 |

FOREIGN PATENT DOCUMENTS

| | | |
|---|---|---|
| CN | 103809542 A | 5/2014 |
| CN | 104573966 A | 4/2015 |
| CN | 205230136 U | 5/2016 |

OTHER PUBLICATIONS

International Search Report and Written Opinion from PCT Application No. PCT/IB2021/051716, dated Jun. 1, 2021.
Yousefpour et al., "All one needs to know about fog computing and related edge computing paradigms: A complete survey" Journal of Systems Architecture, vol. 98, 2019, pp. 289-330.
Chatfield et al., "A framework for Internet of Things-enabled smart government: A case of IoT cybersecurity policies and use cases in U.S. federal government," Government Information Quarterly, vol. 26, 2019, pp. 346-357.
Seif et al., "Implementing Industry 4.0 Asset Administrative Shells in Mini Factories," Procedia Computer Science, vol. 159, 2019, pp. 495-504.

* cited by examiner

*Primary Examiner* — Alan S Chou
(74) *Attorney, Agent, or Firm* — Zilka-Kotab, P.C.

(57) ABSTRACT

As described herein, a system, method, and computer program are provided for Internet of Things (IoT) community services. In use, a platform of an IoT network is provided to a plurality of IoT devices of the IoT network, where the platform has one or more services accessible to the plurality of IoT devices. Further, the platform executes the one or more services to enhance functionality of the plurality of IoT devices.

16 Claims, 7 Drawing Sheets

SYSTEM, METHOD, AND COMPUTER PROGRAM FOR INTERNET OF THINGS (IOT) COMMUNITY SERVICES

FIELD OF THE INVENTION

The present invention relates to Internet of Things (IoT) devices.

BACKGROUND

The Internet of Things (IoT) refers to the interconnection of computing devices (also referred to IoT devices) via the Internet which enables the computing devices to send and/or receive data. For example, IoT technology may allow the computing devices to communicate with one another. In some embodiments, the computing devices may be embedded in everyday objects, such as home appliances, and/or may include mobile devices, personal devices, etc.

To date, IoT technology has been limited to being used in the context of the existing capabilities of the IoT devices, including being used for gathering data from the IoT devices and/or initiating existing functionality of the IoT devices. However, IoT technology has not been extended for use in improving the functionality of the IoT devices themselves.

There is thus a need for addressing these and/or other issues associated with the prior art.

SUMMARY

As described herein, a system, method, and computer program are provided for Internet of Things (IoT) community services. In use, a platform of an IoT network is provided to a plurality of IoT devices of the IoT network, where the platform has one or more services accessible to the plurality of IoT devices. Further, the platform executes the one or more services to enhance functionality of the plurality of IoT devices.

DETAILED DESCRIPTION

Figure 1:
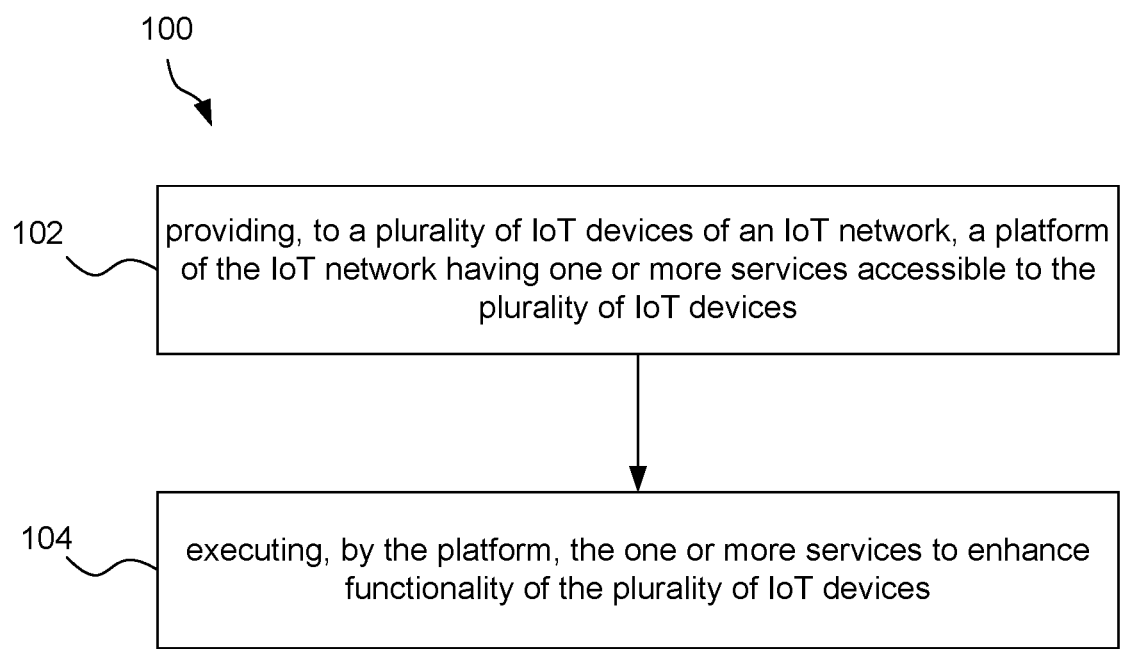
FIG. 1 illustrates a method for providing Internet of Things (IoT) community services, in accordance with one embodiment.

FIG. 1 illustrates a method 100 for providing Internet of Things (IoT) community services, in accordance with one embodiment. The method 100 may be carried out by one or more computing device (e.g. servers) located within an IoT network. For example, the method 100 may be carried out by a computer processor, software, or any combination thereof.

As shown in operation 102, a platform of an IoT network is provided to a plurality of IoT devices of the IoT network, where the platform has one or more services accessible to the plurality of IoT devices. In the context of the present description, the IoT network is any network enabling communications between IoT devices. In addition, the IoT devices may be any devices capable of communicating over the IoT network, such as computing devices embedded in everyday objects (e.g. home appliances, etc.), mobile devices, personal devices, etc.

It should be noted that providing the platform refers to making the platform accessible to the IoT devices. In particular, the platform is provided to make the one or more services of the platform accessible to the IoT devices. Thus, the platform may be any environment (e.g. configured in software and/or hardware) which provides (e.g. stores, executes, etc. computer code representing) the one or more services for use by the IoT devices. In one embodiment, the platform may be located on one or more computing devices (e.g. servers) of the IoT network.

Further, as shown in operation 104, the platform executes the one or more services to enhance functionality of the IoT devices. The platform may execute the services upon request by the IoT devices. In any case, the one or more services of the platform are each any service configured to enhance functionality (e.g. operation) of the IoT devices. Enhancing the operation of the IoT devices may include adding new functionality to the IoT devices, increasing a rate at which tasks are completed, enabling collaboration between the IoT devices to achieve certain goals (e.g. complete certain functions), or any other improvement to functionality of the IoT devices.

In one embodiment, the one or more services may include a skills library service providing a library through which the IoT devices share skills with one another. In another embodiment, the one or more services may include a task sharing bus service providing a task sharing bus through which the IoT devices share tasks with one another. In yet another embodiment, the one or more services may include a partner bridging service providing a virtual bridge through which the IoT devices communicate to achieve a common goal. More details regarding the exemplary embodiments of these services will be described below with reference to FIGS. 3-5.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
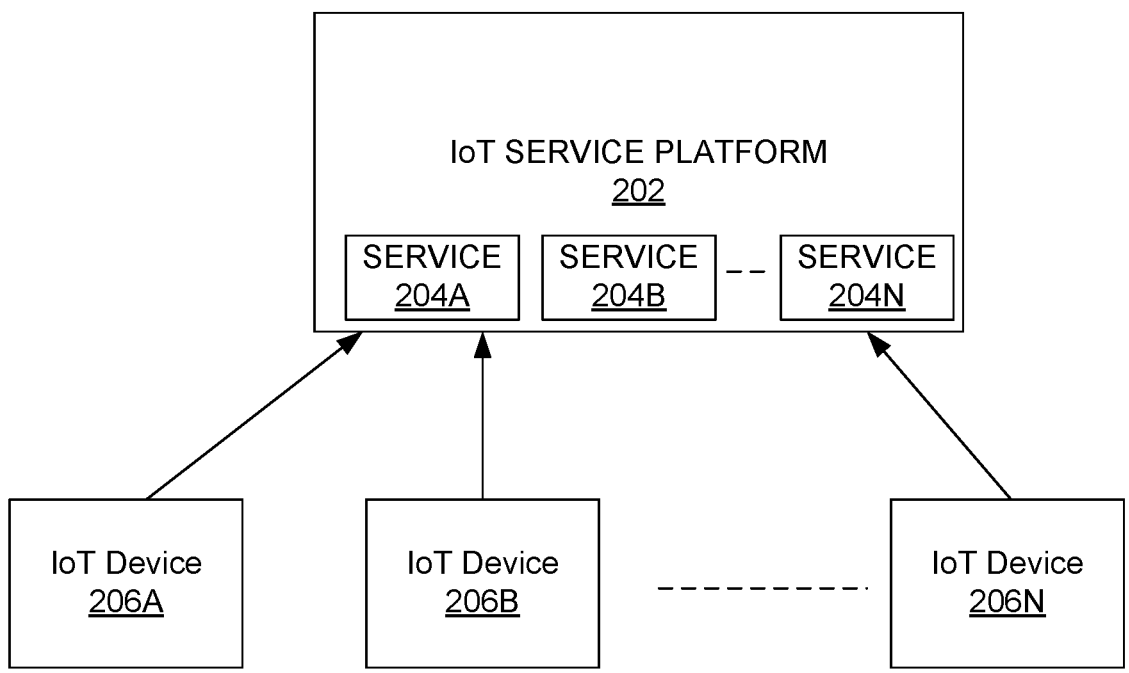
FIG. 2 illustrates a system providing IoT community services, in accordance with one embodiment.

FIG. 2 illustrates a system 200 providing IoT community services, in accordance with one embodiment. As an option, system 200 may be implemented in the context of the details of the previous figure and/or any subsequent figure(s). Of course, however, the system 200 may be implemented in the context of any desired environment. Further, the aforementioned definitions may equally apply to the description below.

As shown, an IoT service platform 202 is provided to a plurality of IoT devices 206A-N. The IoT service platform 202 and IoT devices 206A-N may be located in a common IoT network. Thus, communications between the IoT service platform 202 and IoT devices 206A-N may be enabled via the IoT network. In an embodiment, the IoT service platform 202 may be located on a server or other computing device of the IoT network.

As also shown, the IoT service platform 202 has (e.g. provides) one or more services 204A-N that are accessible to the IoT devices 206A-N. The services are operable to enhance functionality of the IoT devices 206A-N. For example, the services may include a skills library service providing a library through which the IoT devices share skills with one another (e.g. see FIG. 3); a task sharing bus service providing a task sharing bus through which the IoT devices share tasks with one another (e.g. see FIG. 4); and/or a partner bridging service providing a virtual bridge through which the IoT devices communicate to achieve a common goal (e.g. see FIG. 5).

Figure 3:
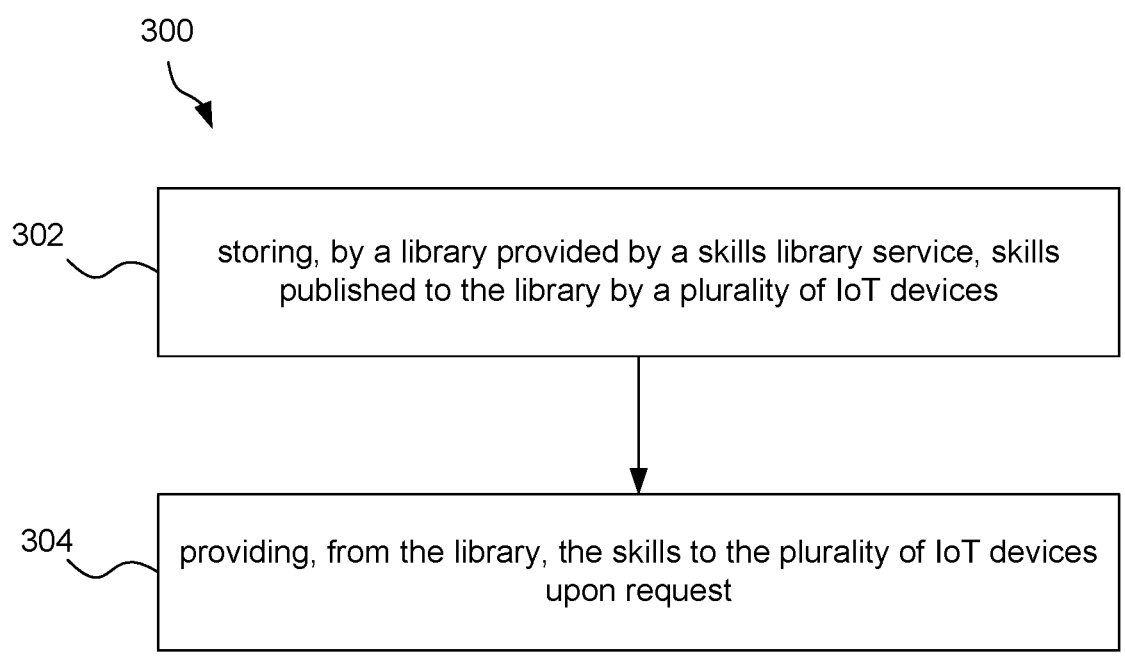
FIG. 3 illustrates a method of the system of FIG. 2 for providing a skills library service, in accordance with one embodiment.

FIG. 3 illustrates a method 300 of the system 200 of FIG. 2 for providing a skills library service, in accordance with one embodiment. The method 300 may be performed by the IoT service platform 202 of the system 200. It should be noted that the method 300 is just one exemplary implementation of the skills library service mentioned above.

As shown in operation 302, a library of the skills library service stores skills published to the library by the IoT devices 206A-N. The skills may each be computer code, an IoT device configuration, or any other information held by one of the IoT devices 206A-N that could be used to enhance functionality of another one of the IoT devices 206A-N.

The library may be any repository capable of storing the skills and making those skills accessible to the IoT devices 206A-N. For example, the library may be searchable by the IoT devices 206A-N for retrieving one or more of the skills published to the library. Further, in operation 304, the skills are provided from the library to the IoT devices 206A-N upon request.

In one exemplary embodiment, one or more of the IoT devices 206A-N equipped with machine learning capabilities may be designed to evolve and learn from the moment they are activated. These IoT devices 206A-N can be called to perform activities which offer them opportunities to develop new skills in unique ways.

The skills library service allows these IoT devices 206A-N to share those skills, by either sharing the new lines of code which accomplish a newly learned function and/or sharing the data and configuration which are required to fulfill the newly learned function.

The library may be available on the IoT network to allow the IoT devices 206A-N to communicate to it directly. The library may store all skills reported by the IoT devices 206A-N, optionally with the details of the IoT device 206A-N who owns the skill. The skills may be organized in multiple orders based on various attributes, such as the IoT device 206A-N which reported the skill, the range of IoT devices 206A-N the skill fits, the language in which the skill is written, the value the skill is meant to provide, the improvement the skill provides over other methods, etc.

In an embodiment, the library may be searchable by IoT devices 206A-N which are looking for workable efficient solutions to a task they were assigned to perform (e.g. when those IoT devices 206A-N are not already operable to perform the task or when the IoT devices 206A-N prefer more efficient functionality to perform the task).

IoT devices 206A-N which select to adopt a skill published to the library may, in one embodiment, be required to pay a fee from the account of the IoT device 206A-N owner for the use of the skill, thereby purchasing the right to learn the skill. The money from the purchase may be paid back to the owner of the IoT device 206A-N which published the skill, optionally with a commission for the community library service. The payment for the skill may be done as a money transfer or as an internal coin of the community services of the platform 202 which would allow the IoT device 206A-N publishing the skill to learn skills of his own from the library utilizing the coin. The value of a skill in the library may start from a standard rate and may be determined by any attribute of the skill, such as the type of skill, language or popularity of the IoT devices 206A-N it can be applied on, etc. The value of the skill may also adjust over time as the popularity of the skill among IoT devices 206A-N goes up or down.

Figure 4:
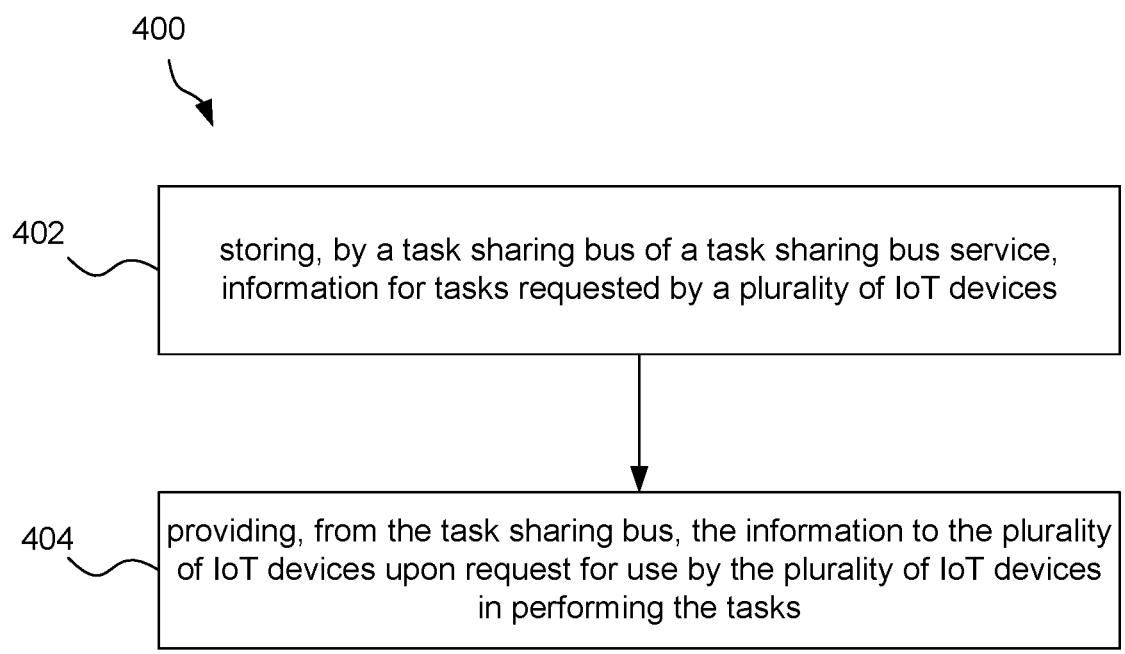
FIG. 4 illustrates a method of the system of FIG. 2 for providing a task sharing bus service, in accordance with one embodiment.

FIG. 4 illustrates a method 400 of the system 200 of FIG. 2 for providing a task sharing bus service, in accordance with one embodiment. The method 400 may be performed by the IoT service platform 202 of the system 200. It should be noted that the method 400 is just one exemplary implementation of the skills library service mentioned above.

As shown in operation 402, a task sharing bus of the task sharing bus service stores information for tasks requested by the IoT devices 206A-N. For each task, the information may include a description of work requested to be performed. Thus, each task may be work that is being requested to be performed for the requesting IoT device 206A-N.

In operation 404, the information is provided from the task sharing bus to the IoT devices 206A-N upon request for use by the IoT devices 206A-N in performing the tasks. To this end, the task sharing bus may be any repository capable of storing the information for the requested tasks and making that information accessible to the IoT devices 206A-N. For example, the task sharing bus may be accessible to the IoT devices 206A-N for identifying one or more of the tasks published to the task sharing bus. When an IoT device 206A-N retrieves a task from the task sharing bus, the IoT device 206A-N may perform the task and publish results of the task either back to the task sharing bus for retrieving by the requesting IoT device 206A-N or may send the results directly to the requesting IoT device 206A-N.

In one exemplary embodiment, an IoT device 206A-N which performs complex tasks for which help is needed from other IoT devices 206A-N can publish to the task sharing bus a request. The requests published may include multiple attributes detailing the requested task, including information such as: the nature of the task required, the instructions for the required task to be completed, the location in which the task should be performed in (if such is required), the location in which the product (results) the task produces or modifies needs to be delivered to (if such is required), the quality of work expected, the description of the required product the task should enable, etc.

To facilitate the completion of complex tasks, the requesting IoT device 206A-N may break down the task to sub-tasks allowing IoT devices 206A-N with skills limited to a certain aspect (sub-task) of the task to perform the sub-task which is within its skill set while other IoT devices 206A-N complete the remaining sub-tasks.

Examples of tasks an IoT device 206A-N may publish to the task sharing bus for being up by other IoT devices 206A-N may include, but are not limited to the following.

Example 1: An IoT device 206A-N is required by its owner to take care of plants in the owner's house, but one day a plant dies and is needed to be replaced. The IoT device 206A-N requests to package a plant of the same type and ship it to the owner's address. The IoT device 206A-N provides, to the task sharing bus, the details of the plant which needs to be found and packaged as a first sub-task and the shipment details as a second sub-task dependent on the first sub-task. The first IoT device 206A-N which picks up the first sub-task from the task sharing bus provides to the task sharing bus the details of the packaged plant, so a second IoT device 206A-N may retrieve the details from the task sharing bus and handle the shipment as the second sub-task.

Example 2: An autonomous cooking IoT device 206A-N is required to produce a very high order within a very short time. As a single device, the IoT device 206A-N can only produce a fraction of the order. A task with multiple sub-tasks is published to the task sharing bus by the autonomous cooking IoT device 206A-N, where each product is requested to be produced as a sub-task limited to devices within a range or proximity to the requesting autonomous cooking IoT device 206A-N. Multiple local cooking IoT devices 206A-N within the same area retrieve the sub-tasks from the task sharing bus and complete the various products, and in turn the owner of the autonomous cooking IoT device 206A-N is notified for collecting the products from the various locations of the local cooking IoT devices 206A-N.

Example 3: An IoT device 206A-N is responsible for a network coverage at a certain location. The IoT device 206A-N must go under maintenance for several hours. Before shutting down, the IoT device 206A-N publishes a task to the task sharing bus for any other IoT device 206A-N in the same location to allow relaying network traffic for this time-period when the IoT device 206A-N will be shut down. Multiple IoT devices 206A-N may be required to relay the traffic, some of which may go in and out of the area during the required period, thus covering only part of the task for part of the time. IoT devices 206A-N which accept a task may get paid for the activity they perform. The payment may be paid to the account of the owner of the IoT device 206A-N fulfilling the task or it may be paid utilizing an internal coin of the community platform 202 to the account of the IoT device 206A-N.

To fund the task, the IoT device 206A-N requesting the task may also submit an amount to be paid and the amount may be collected upfront by the community platform 202, so the account will not need to be contacted at the time of completion. As another option, the amount may be committed when publishing the task but only collected when the task is completed. The decision of which type of payment to take may change depending on the type of task or other attributes. The community platform 202 may take a commission for tasks paid.

Figure 5:
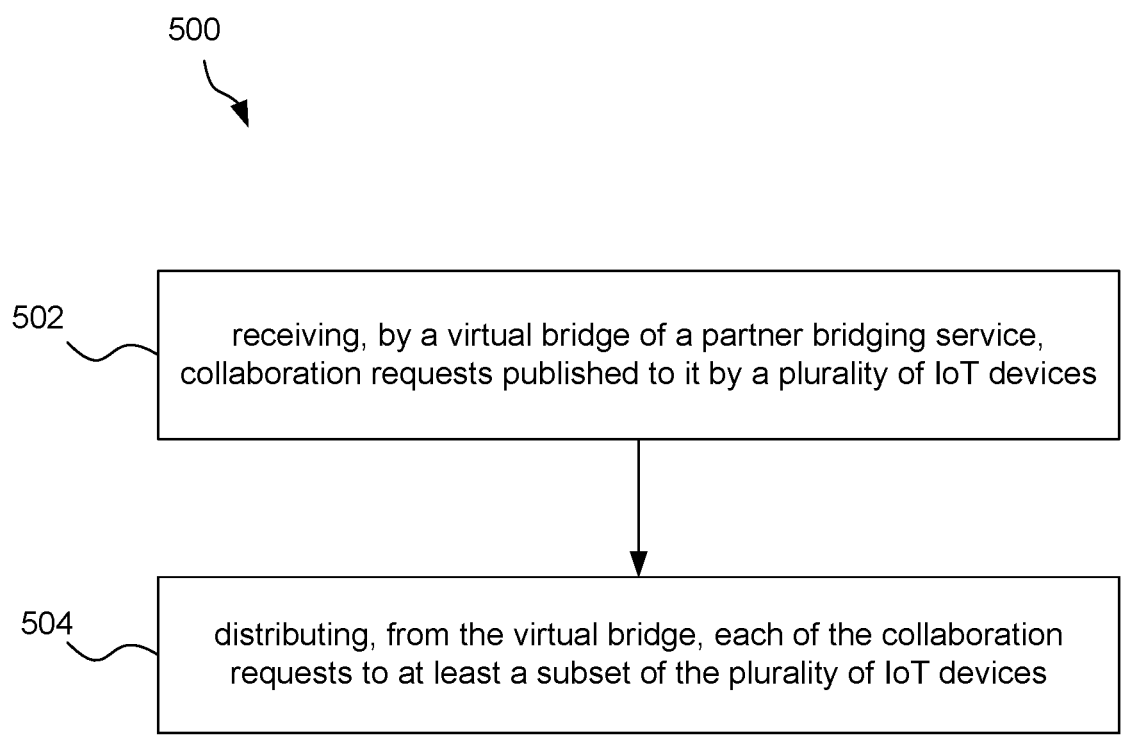
FIG. 5 illustrates a method of the system of FIG. 2 for providing a partner bridging service, in accordance with one embodiment.

FIG. 5 illustrates a method 500 of the system 200 of FIG. 2 for providing a partner bridging service, in accordance with one embodiment. The method 500 may be performed by the IoT service platform 202 of the system 200. It should be noted that the method 500 is just one exemplary implementation of the skills library service mentioned above.

As shown in operation 502, a virtual bridge of a partner bridging service receives collaboration requests published to it by a plurality of IoT devices 206A-N. The collaboration requests each include a request from one IoT device 206A-N for one or more additional IoT devices 206A-N to collaborate with the one IoT device 206A-N to accomplish a common goal. Thus, the IoT devices 206A-N may communicate through the virtual bridge to achieve the common goal. The virtual bridge may be a central communication service, which all IoT devices 206A-N can connect to in order to enable communication between the IoT devices 206A-N. In another embodiment, the virtual bridge may be the element all IoT devices 206A-N which require collaboration can connect to, in order to find other IoT devices 206A-N which they can collaborate with.

In operation 504, each of the collaboration requests is distributed from the virtual bridge to at least a subset of the IoT devices 206A-N. A collaboration request may be distributed to IoT devices 206A-N that are selected (by the platform 202) based on criteria defined for the collaboration request (e.g. criteria defined by the requesting IoT device 206A-N). When an IoT device 206A-N receives the collaboration request from the virtual bridge, the IoT device 206A-N may choose whether to collaborate with the requesting IoT device 206A-N. The choice may be communicated back to the requesting IoT device 206A-N.

For example, while outsourcing tasks allows an IoT device 206A-N to complete activities that can be done off line, there may be goals IoT devices 206A-N have which require partnering with other IoT devices 206A-N and remaining in constant communication to achieve the goal. The platform 2020 may include virtual bridges to allow communication between IoT devices 206A-N which need to partner to achieve a chain of tasks which require online collaboration between the IoT devices 206A-N.

The virtual bridges may support multiple methods of communication in multiple computer languages and technologies. The virtual bridges may also support translation of the commands flowing between the machines to allow devices which communicate in different languages to pass messages while the virtual bridge translates the communication to the language the receiving end requires. The virtual bridge may support collaboration of multiple IoT devices 206A-N on a single virtual bridge all working together towards a common goal.

The virtual bridge may support reaching out to a population of IoT devices 206A-N which fit a criterion defined by the IoT device 206A-N which opened (requested) the virtual bridge. The criterion may include diverse attributes such as skills of the IoT devices 206A-N it is reaching out to, the location of the IoT devices 206A-N or the proximity of the IoT devices 206A-N to the IoT device 206A-N which opened the virtual bridge. This ability enables reacting to an IoT device 206A-N in an emergency state.

Examples of uses of the partner bridging service may include, but are not limited to, the following.

Example 1: A security system (IoT device 206A-N) in a house identifies a dangerous robber is trying to run away from the house. He is caught on camera controlled by the security system and the cops are alerted, but he is starting to get out of the range the cameras of the security system can cover. The system partners with nearby security systems (IoT devices 206A-N), through the virtual bridge, to point their cameras on him, track his movements and send to the police a continuous video of the criminal to assist in his capture.

Example 2: An autonomous car (IoT device 206A-N) can navigate the road at high speeds without reaching out to the cars (IoT devices 206A-N) around it. However, once emergency strikes and the car is out of control endangering its passengers and the cars around it, the IoT device 206A-N navigating the car may reach out to the cars around it through a virtual bridge broadcasting to the cars to join the virtual bridge. Cars joining can receive from the IoT device 206A-N data on its current trajectory to avoid collision or even to assist in slowing down the out of control car and forcing it to a safe location to stop.

Example 3: An IoT device 206A-N designed to allow blind people to see, by translating images of the surrounding to electronic signals and broadcasting those to the visual part of the brain, may utilize a camera located on its owner for a majority of the images it collects. However, should that camera be compromised or have limitations in collecting all images needed to give a full range, the IoT device 206A-N may reach out to other cameras in the vicinity which are in the community, through a virtual bridge, to provide added images so the person using the device will not be impacted by the limitations of his camera and lose his eye sight.

Example 4: IoT devices 206A-N responsible for managing inventory in stores may hold an open virtual bridge to: (1) communicate inventory surpasses; (2) balance inventory by trading in the surplus items with stores which require the items, and (3) get items which close shortages without having to go back to suppliers. Such a virtual bridge may hold hundreds of stores in constant communication as customers buy items and shortages start generating in specific items. This can be especially crucial for inventories including medical or other quick perishing commodities.

The Value of Paying for Services on the Community Platform

The resources of the IoT devices 206A-N devices, and the resources which the IoT devices 206A-N utilize to perform their activities, are limited. Placing a value (monetary or internal to the platform 202) to an activity in the community allows those resources to be managed and to verify that an equivalent resource is returned for the one invested.

The ability to generate income to the owner of an IoT device 206A-N may encourage owners of IoT devices 206A-N to invest in their IoT devices 206A-N, and allocate time and effort to train machine learning IoT devices 206A-N in new skills, or allocate time for IoT devices 206A-N to take on tasks from the community, thus reducing the need for added resources to be wasted to achieve the same goal.

Figure 6:
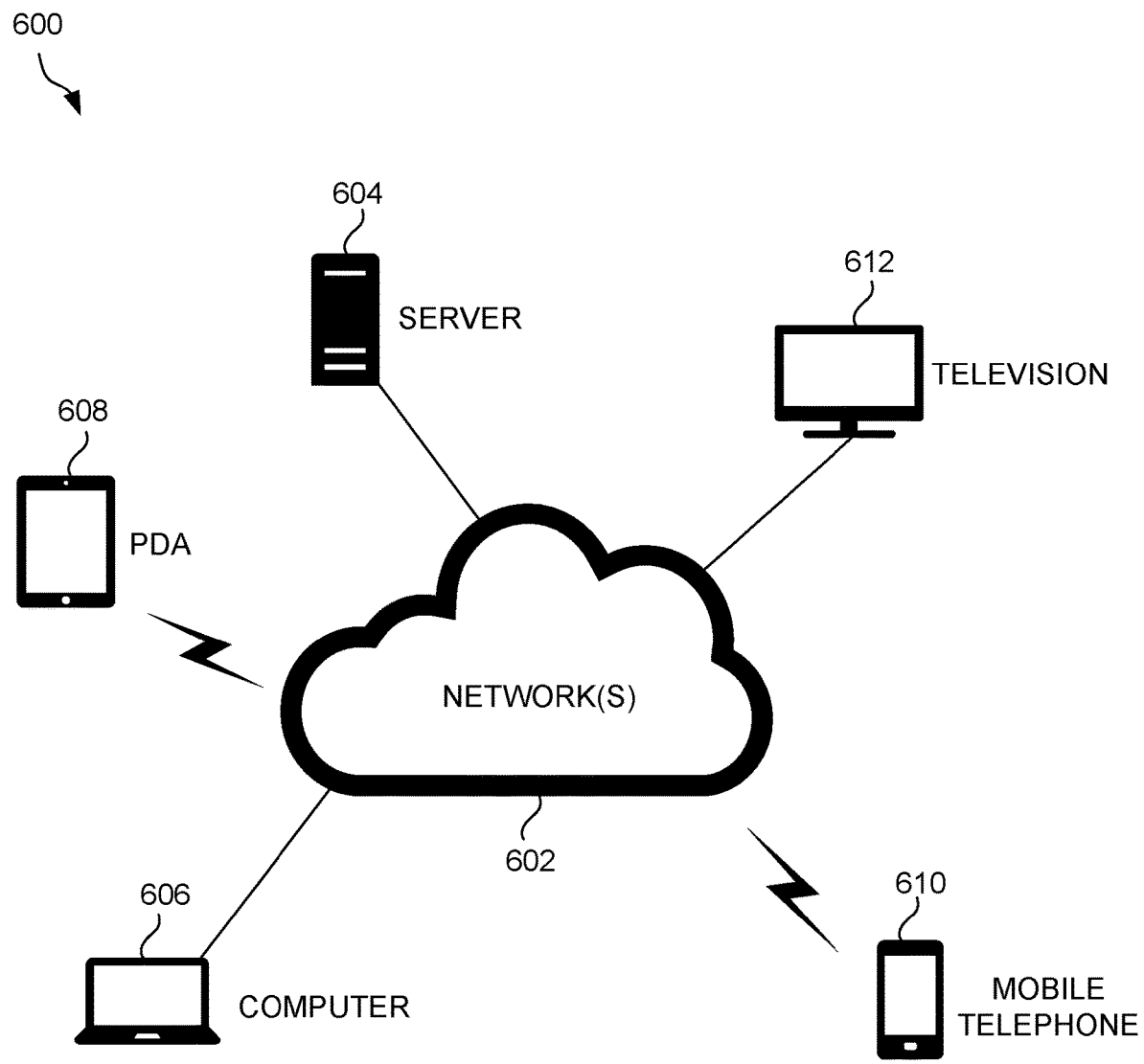
FIG. 6 illustrates a network architecture, in accordance with one possible embodiment.

FIG. 6 illustrates a network architecture 600, in accordance with one possible embodiment. As shown, at least one network 602 is provided. In the context of the present network architecture 600, the network 602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 602 may be provided.

Coupled to the network 602 is a plurality of devices. For example, a server computer 604 and an end user computer 606 may be coupled to the network 602 for communication purposes. Such end user computer 606 may include a desktop computer, lap-top computer, and/or any other type of logic. Still yet, various other devices may be coupled to the network 602 including a personal digital assistant (PDA) device 608, a mobile phone device 610, a television 612, etc.

Figure 7:
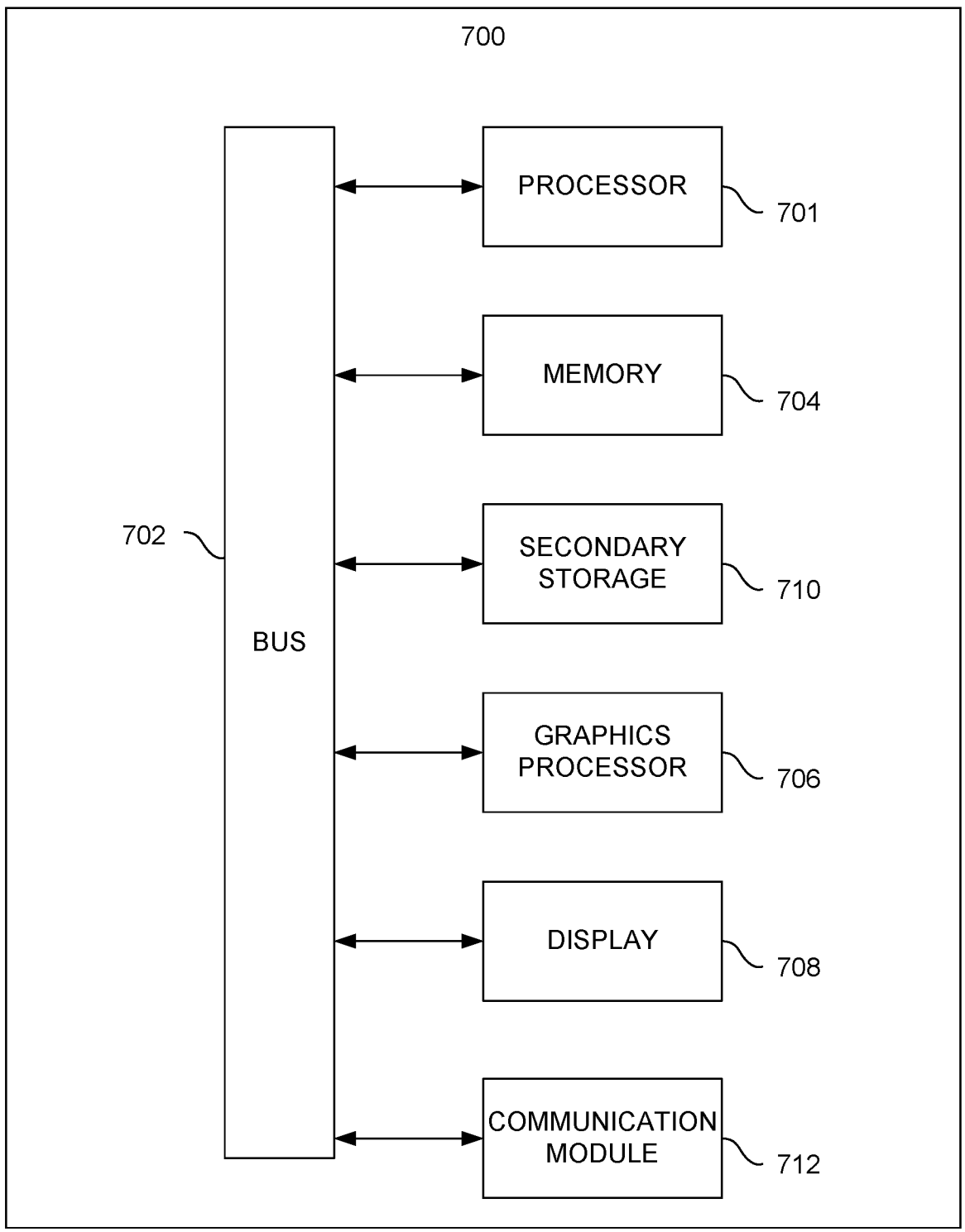
FIG. 7 illustrates an exemplary system, in accordance with one embodiment.

FIG. 7 illustrates an exemplary system 700, in accordance with one embodiment. As an option, the system 700 may be implemented in the context of any of the devices of the network architecture 600 of FIG. 6. Of course, the system 700 may be implemented in any desired environment.

As shown, a system 700 is provided including at least one central processor 701 which is connected to a communication bus 702. The system 700 also includes main memory 704 [e.g. random access memory (RAM), etc.]. The system 700 also includes a graphics processor 706 and a display 708.

The system 700 may also include a secondary storage 710. The secondary storage 710 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 704, the secondary storage 710, and/or any other memory, for that matter. Such computer programs, when executed, enable the system 700 to perform various functions (as set forth above, for example). Memory 704, storage 710 and/or any other storage are possible examples of non-transitory computer-readable media.

The system 700 may also include one or more communication modules 712. The communication module 712 may be operable to facilitate communication between the system 700 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method comprising:
   providing, to a plurality of Internet of Things (IoT) devices of an IoT network, a platform of the IoT network that is independent of the IoT devices and that has one or more services that are accessible to the plurality of IoT devices, the one or more services including a skills library service providing a library through which the plurality of IoT devices share their skills with one another; and
   executing, by the platform, the one or more services to enhance functionality of the plurality of IoT devices, including for the skills library service:
   storing, in the library, the skills of the plurality of IoT devices, wherein the skill are published to the library by the plurality of IoT devices, the skills including at least one of computer code of the plurality of IoT devices or an IoT device configuration of the plurality of IoT devices,
   making the library searchable by the IoT devices,
   receiving, from a first IoT device of the plurality of IoT devices that is equipped with a machine learning capability and that has used the machine learning capability to learn a new function, new lines of code which accomplish the new function and the data and configuration which are required to fulfill the new function,
   storing, in the library, the new function including the new lines of code which accomplish the new function along with the data and configuration which are required to fulfill the new function,
   making the new function available to the plurality of IoT devices, via the library,
   receiving, by the skills library service from a second IoT device of the plurality of IoT devices, a request for the new function, and
   responsive to the request, providing the new function to the second IoT device of the plurality of IoT devices including providing to the second IoT device of the plurality of IoT devices the new lines of code which accomplish the new function along with the data and configuration which are required to fulfill the new function.

2. The non-transitory computer readable medium of claim 1, wherein the one or more services include a task sharing bus service providing a task sharing bus through which the plurality of IoT devices share tasks with one another.

3. The non-transitory computer readable medium of claim 2, wherein the task sharing bus stores information for tasks requested by the plurality of IoT devices.

4. The non-transitory computer readable medium of claim 3, wherein the task sharing bus is accessible to the plurality of IoT devices for identifying one or more of the tasks published to the task sharing bus.

5. The non-transitory computer readable medium of claim 3, wherein the information include a description of work requested to be performed.

6. The non-transitory computer readable medium of claim 2, wherein executing the one or more services to enhance functionality of the plurality of IoT devices includes executing the task sharing bus service to enhance the functionality of the plurality of IoT devices by:
   storing, by the task sharing bus, information for tasks requested by the plurality of IoT devices, and
   providing, from the task sharing bus, the information to the plurality of IoT devices upon request for use by the plurality of IoT devices in performing the tasks.

7. The non-transitory computer readable medium of claim 1, wherein the one or more services include a partner bridging service providing a virtual bridge through which the plurality of IoT devices communicate to achieve a common goal.

8. The non-transitory computer readable medium of claim 7, wherein the virtual bridge receives collaboration requests published to it by the plurality of IoT devices.

9. The non-transitory computer readable medium of claim 8, wherein the virtual bridge distributes the collaboration requests to at least a subset of the plurality of IoT devices.

10. The non-transitory computer readable medium of claim 7, wherein executing the one or more services to enhance functionality of the plurality of IoT devices includes executing the partner bridging service to enhance the functionality of the plurality of IoT devices by:
    receiving, by the virtual bridge, collaboration requests published to it by the plurality of IoT devices, and
    distributing, from the virtual bridge, each of the collaboration requests to at least a subset of the plurality of IoT devices.

11. The non-transitory computer readable medium of claim 1, wherein the second IoT device of the plurality of IoT devices is not already operable to perform a task to which the second IoT device of the plurality of IoT devices has been assigned, and wherein the second IoT device of the plurality of IoT devices requests the new function for use in performing the task.

12. The non-transitory computer readable medium of claim 1, wherein providing the new function to the second IoT device of the plurality of IoT devices enables the second IoT device of the plurality of IoT devices to more efficiently perform a task to which it has been assigned.

13. A method, comprising:
    providing, to a plurality of Internet of Things (IoT) devices of an IoT network, a platform of the IoT network that is independent of the IoT devices and that has one or more services that are accessible to the plurality of IoT devices, the one or more services including a skills library service providing a library through which the plurality of IoT devices share their skills with one another; and
    executing, by the platform, the one or more services to enhance functionality of the plurality of IoT devices, including for the skills library service:
        storing, in the library, the skills of the plurality of IoT devices, wherein the skill are published to the library by the plurality of IoT devices, the skills including at least one of computer code of the plurality of IoT devices or an IoT device configuration of the plurality of IoT devices,
        making the library searchable by the IoT devices,
        receiving, from a first IoT device of the plurality of IoT devices that is equipped with a machine learning capability and that has used the machine learning capability to learn a new function, new lines of code which accomplish the new function and the data and configuration which are required to fulfill the new function,
        storing, in the library, the new function including the new lines of code which accomplish the new function along with the data and configuration which are required to fulfill the new function,
        making the new function available to the plurality of IoT devices, via the library,
        receiving, by the skills library service from a second IoT device of the plurality of IoT devices, a request for the new function, and
        responsive to the request, providing the new function to the second IoT device of the plurality of IoT devices including providing to the second IoT device of the plurality of IoT devices the new lines of code which accomplish the new function along with the data and configuration which are required to fulfill the new function.

14. A system providing an IoT platform, comprising:
    a non-transitory memory storing instructions; and
    one or more processors in communication with the non-transitory memory that execute the instructions to perform a method comprising:
    providing, to a plurality of Internet of Things (IoT) devices of an IoT network, a platform of the IoT network that is independent of the IoT devices and that has one or more services that are accessible to the plurality of IoT devices, the one or more services including a skills library service providing a library through which the plurality of IoT devices share their skills with one another; and
        executing, by the platform, the one or more services to enhance functionality of the plurality of IoT devices, including for the skills library service:
            storing, in the library, the skills of the plurality of IoT devices, wherein the skill are published to the library by the plurality of IoT devices, the skills including at least one of computer code of the plurality of IoT devices or an IoT device configuration of the plurality of IoT devices,
            making the library searchable by the IoT devices,
            receiving, from a first IoT device of the plurality of IoT devices that is equipped with a machine learning capability and that has used the machine learning capability to learn a new function, new lines of code which accomplish the new function and the data and configuration which are required to fulfill the new function,
            storing, in the library, the new function including the new lines of code which accomplish the new function along with the data and configuration which are required to fulfill the new function,
            making the new function available to the plurality of IoT devices, via the library,
            receiving, by the skills library service from a second IoT device of the plurality of IoT devices, a request for the new function, and
            responsive to the request, providing the new function to the second IoT device of the plurality of IoT devices including providing to the second IoT device of the plurality of IoT devices the new lines of code which accomplish the new function along with the data and configuration which are required to fulfill the new function.

15. The system of claim 14, wherein the one or more services include a task sharing bus service providing a task sharing bus through which the plurality of IoT devices share tasks with one another.

16. The system of claim 14, wherein the one or more services include a partner bridging service providing a virtual bridge through which the plurality of IoT devices communicate to achieve a common goal.

\* \* \* \* \*